United States Patent [19]

Aronne

[11] Patent Number: 5,072,897
[45] Date of Patent: Dec. 17, 1991

[54] PILOT HARNESS FITTING INCORPORATING RESTRAINTS FOR ARMS, LEGS, AND AID OF GRAVITY

[75] Inventor: Armand J. Aronne, New York, N.Y.

[73] Assignee: Grumman Aerospace Corporation, Bethpage, N.Y.

[21] Appl. No.: 567,756

[22] Filed: Aug. 15, 1990

[51] Int. Cl.⁵ .................... B64D 25/02; B64D 17/30
[52] U.S. Cl. .......................... 244/122 AG; 244/151 R
[58] Field of Search ....... 244/122 R, 122 AG, 122 A, 244/151 R; 297/480, 484, 485

[56] References Cited

U.S. PATENT DOCUMENTS 3,202,384  8/1965  Martin ...................... 244/122 AG

FOREIGN PATENT DOCUMENTS 1456007  11/1976  United Kingdom ........ 244/122 AG

OTHER PUBLICATIONS

Lorch, Arm Restraint System for Harness Mounting, 8/05/86, USSIR, #H115.

Primary Examiner—Joseph F. Peters, Jr.
Assistant Examiner—Virna Lissi Mojica
Attorney, Agent, or Firm—Pollock, VandeSande & Priddy

[57] ABSTRACT

A harness fitting has a first member which is secured to the vest of a pilot while a second member is secured to a cockpit floor. The first member has vertical torso restraint straps attached thereto which limits the upward displacement of a pilot, relative to his seat, during normal flight. This results in minimizing injuries that might occur as a result of negative "G" conditions during which time the head of the pilot may be injured during contact with a canopy. Arm and leg restraints are connected to the fitting so that they become pulled in during pilot ejection, thereby reducing the possibility of limb injury.

5 Claims, 4 Drawing Sheets

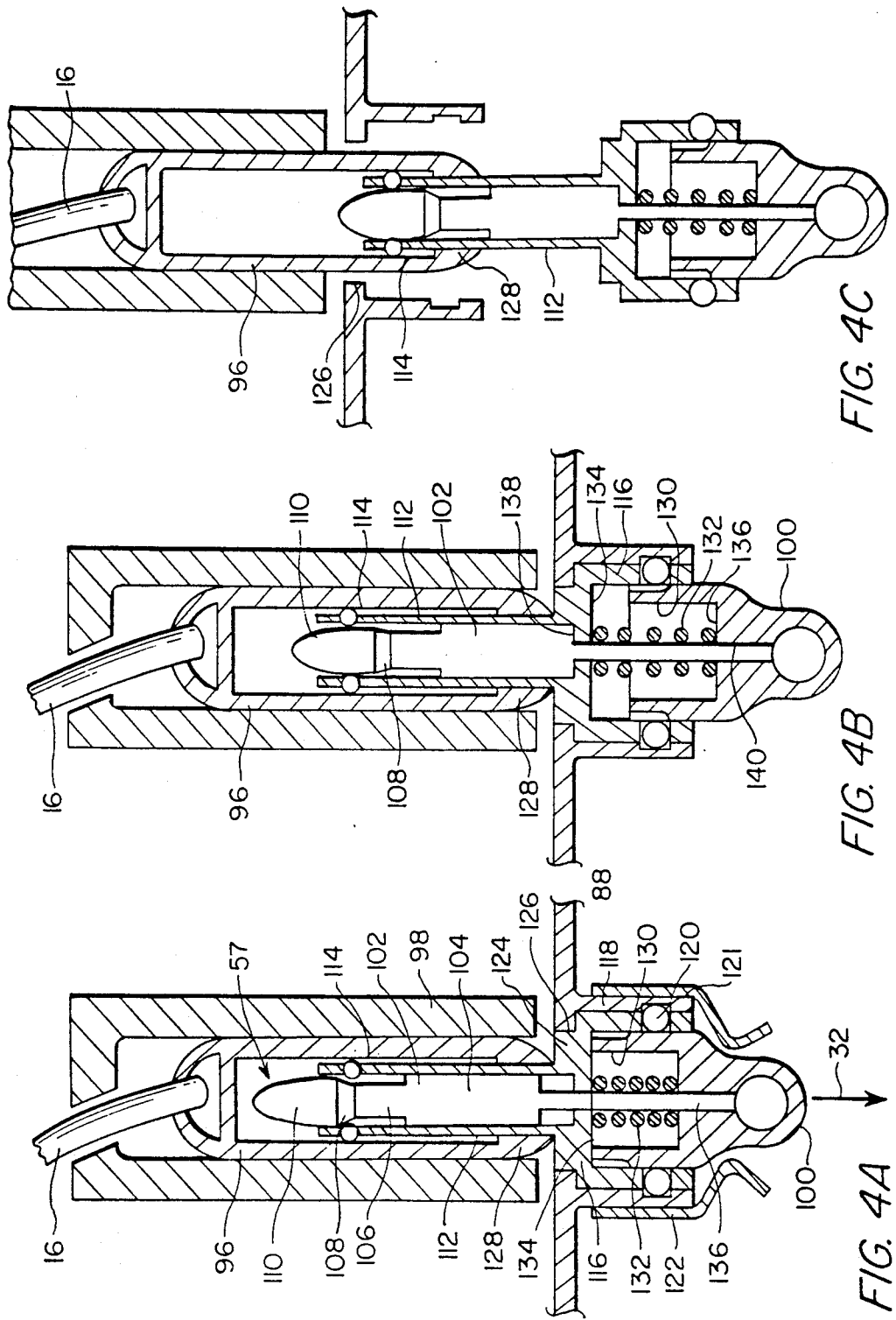

PILOT HARNESS FITTING INCORPORATING RESTRAINTS FOR ARMS, LEGS, AND AID OF GRAVITY

RELATED PATENT APPLICATIONS

The present application relates to co-pending U.S. applications Ser. No. 07/482,755; 07/482,886, all in the name of the same inventor and assigned to the same assignee.

FIELD OF THE INVENTION

The present invention relates to pilot harness fittings, and more particularly to such a composite fitting capable of a plurality of functional restraints during flight and ejection.

BACKGROUND OF THE INVENTION

Military aircraft pilots must be constantly prepared for ejection from their cockpit due to aircraft failure or combat aircraft disablement. A pilot is ejected prior to a parachute landing; but when ejection is under way, it is important that his arms and legs be restrained thereby preventing them from hitting cockpit structures which might injure him. Means have been provided in the past for performing this operation. However, the mechanisms are rather cumbersome.

A further necessity for the pilot is vertical torso restraint to overcome the effects of momentum which, in certain instances, simulate negative gravity ("G"). The result is the displacement of the pilot toward a cockpit canopy which could cause serious bodily damage. A number of such vertical restraints have been proposed and utilized but generally require complicated hitching after the pilot takes his seat in the cockpit and the reverse unlatching of such restraints after flight has been completed.

BRIEF DESCRIPTION OF THE INVENTION

The present invention is directed to a fitting for a military pilot harness which accomplishes three functions as a result of a single composite harness fitting. The three functions include arm restraint, leg restraint, and negative ("G") restraint in situations where such restraint is required, as explained hereinabove.

A simple latching/unlatching mechanism allows the three restraints to be effectuated, simultaneously, when the pilot becomes seated in the cockpit. Conversely, the composite fitting of the present invention permits simple unlatching thereof so as to allow the pilot to release all the restraints, simultaneously, upon normal landing of the aircraft.

The composite fitting of the present invention is a simple and elegant construction which provides the primary objective of safety and reliability while also offering the pilot simple, convenient, and rapid latching and unlatching.

BRIEF DESCRIPTION OF THE FIGURES

The above-mentioned objects and advantages of the present invention will be more clearly understood when considered in conjunction with the accompanying drawings, in which:

FIGS. 4A-4C are partial sectional views of an interference connector employed in the present invention.

DETAILED DESCRIPTION OF THE INVENTION

Figure 1:
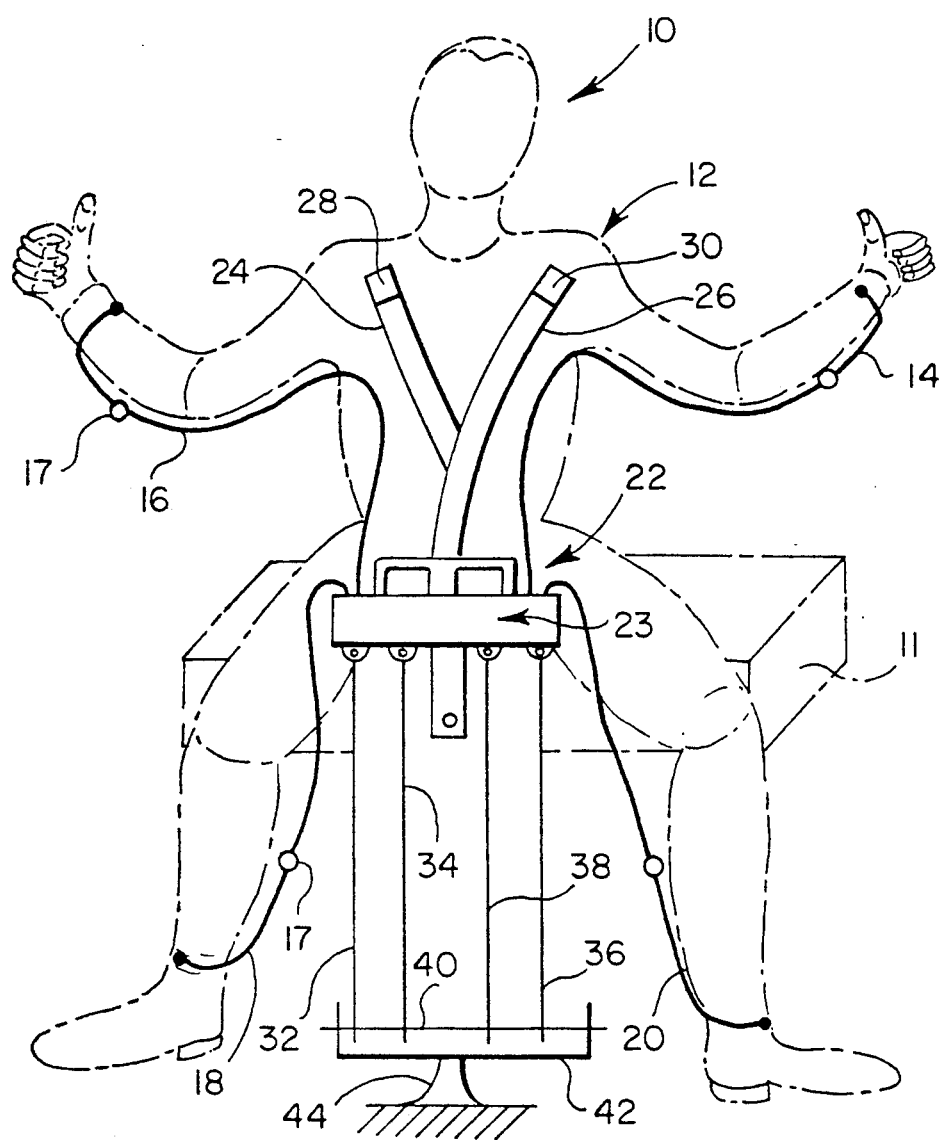
FIG. 1 is a diagrammatic illustration of a pilot equipped with the present invention.

FIG. 1 indicates a diagrammatic representation of a pilot 10 seated within a cockpit and equipped with the present invention. The pilot is equipped with a vest having a conventional torso harness 12 modified by the present invention. Basically, the modification includes arm restraints 14 and 16, as well as leg restraints 18 and 20, all connected to a fitting member generally indicated by reference numeral 22. As will be explained hereinafter, upon ejection from the cockpit, the restraints for the limbs of the pilot are pulled. Since the restraints are attached to the extremities of his limbs, they are likewise pulled in to ensure injury-free ejection.

In addition, the torso harness is modified with negative "G" straps 24 and 26 having their upper ends 28, 30 sewn to the harness or otherwise attached thereto. The lower ends are secured within fitting member 22. The purpose of the negative "G" straps is to limit vertical displacement of the pilot during normal operation of an aircraft so that the likelihood of injury against the canopy is minimized. Fitting member 22 is adapted to be connected to mating connector 23. The upper fitting member 22, when detached from connector 23, permits the pilot to move freely. On the other hand, the lower illustrated mating connector 23 is normally retained within the aircraft by means of attachment lines 32, 34, 36, and 38. The upper ends of these lines are secured to the connector 23 while the lower ends of the lines are secured to a shear pin 40 installed within a bracket 42, the latter being anchored to the cockpit floor 44.

Briefly explained, when the pilot enters the cockpit, he latches the fitting member 22 to connector 23. His limbs are free to operate the controls of his aircraft until such time as ejection is necessary. At such time, the seat 11 upon which he is seated becomes ejected; and as a result, both arms and both legs become pulled inwardly via their respective restraints 14, 16, 18, and 20. As ejection proceeds sufficient tension is applied to the shear pin 40 so as to cause its fracture resulting in free ejection of the pilot through the cockpit while his limbs are safely restrained.

Figure 2B:
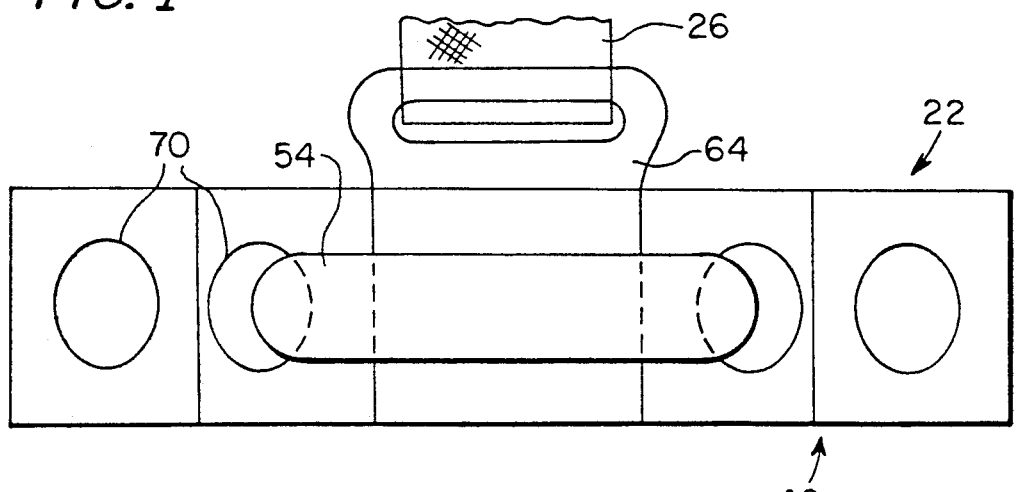
FIG. 2B is a top plan view of the fitting shown in FIG. 2A.
Figure 2A:
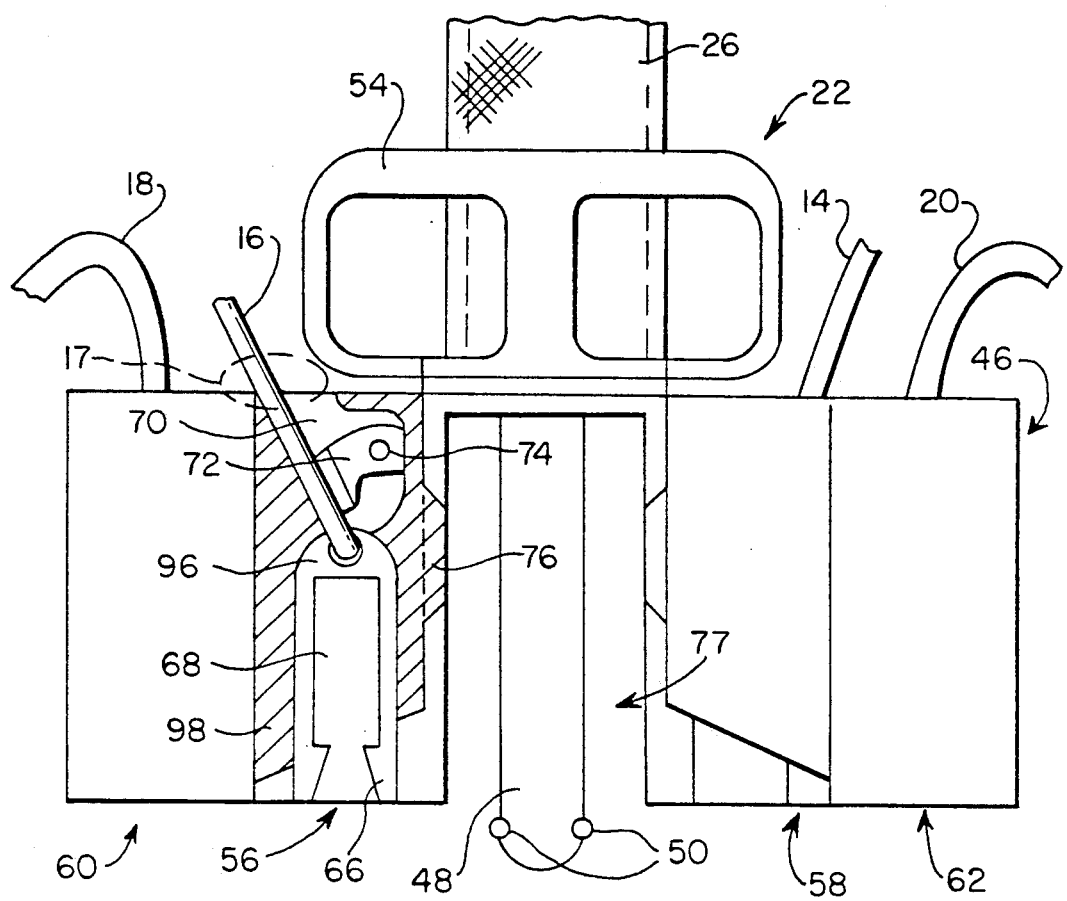
FIG. 2A is a partial sectional view of an upper member of the fitting constituting the present invention.
Figure 2C:
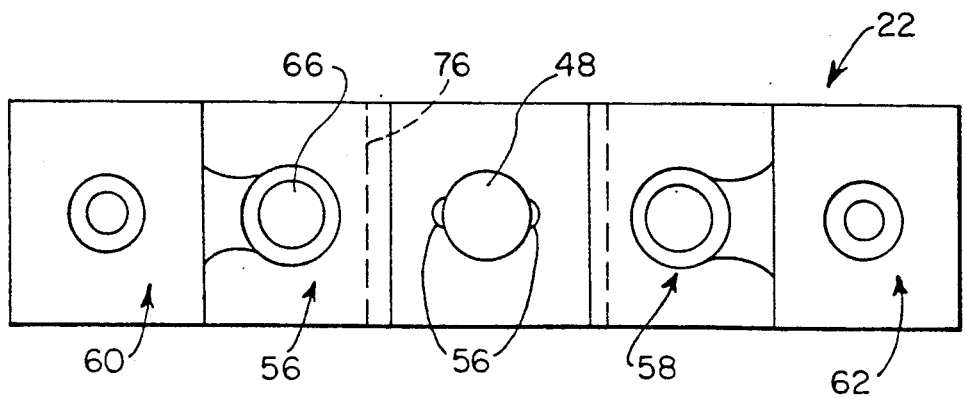
FIG. 2C is a bottom plan view of the fitting member shown in FIG. 2A.

FIG. 2A is a partial sectional view of the upper fitting member 22 wherein a generally rectangular block 46 is seen illustrated. The block has a central opening through which a conventional PIP pin 48 protrudes. As those of skill in the art appreciate, the PIP pin is equipped with detent balls 50 which become pushed in and out. Member 22 is engaged with connector 23 (FIG. 1) via PIP pin 48 thereby selectively gently latching them together, as will be explained in greater detail hereinafter. The pin 48 is incorporated within a handle 54 which facilitates the latching together of fitting member 22 and connector 23. FIG. 2B illustrates the connection of fitting block 46 to strap 26, by means of a bracket 64 perpendicularly oriented and secured to block 46.

Figure 3A:
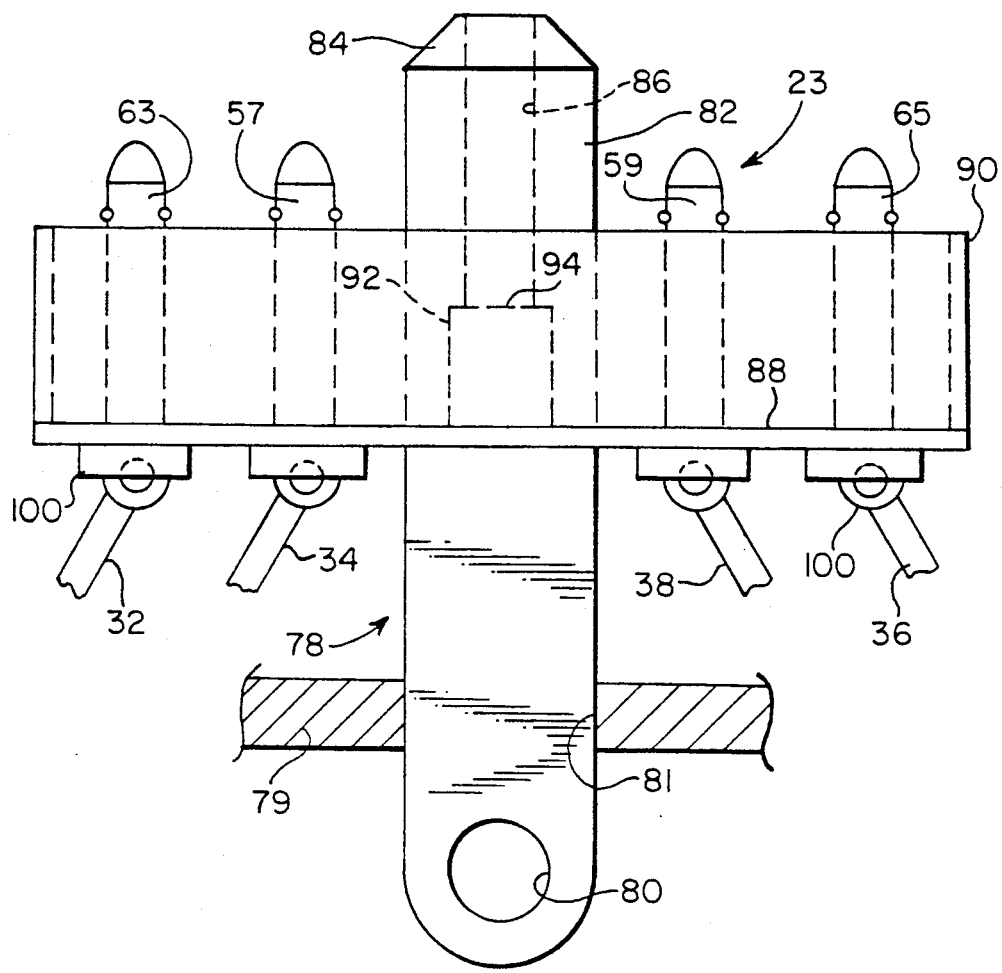
FIG. 3A is a front elevational view of a lower member of the fitting constituting the present invention.
Figure 3B:
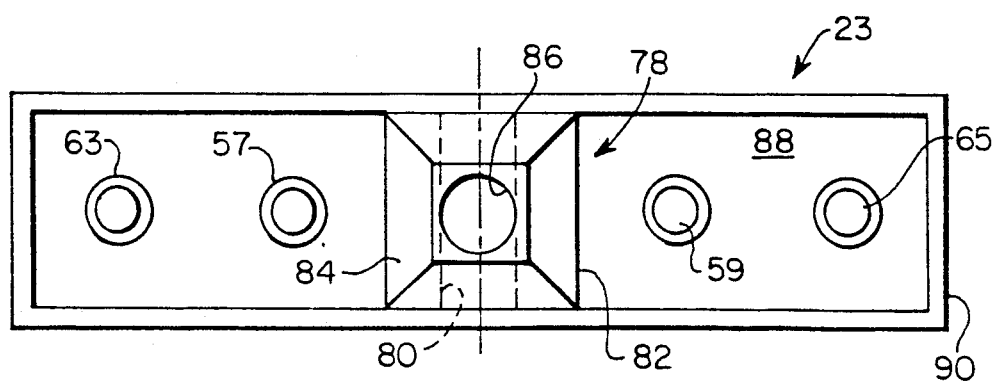
FIG. 3B is a top plan view of the fitting member shown in FIG. 3A.

Within block 46 are four receptacles 56, 58, 60 and 62 which receive corresponding alignment pins 57, 59, 63, and 65 located on the lower connector 23 (FIG. 3A, 3B). Arm restraints 14 and 16 are received within corresponding receptacles 56 and 58. Likewise, receptacles 60 and 62 receive leg restraints 18 and 20.

The fitting member 22 is attached to the pilot's harness and thus moves with him into the cockpit and is gently latched to connector 23. After a normal flight upward lifting of fitting member 22 disconnects this member from connector 23 and the pilot egresses easily.

Within each of the receptacles 56, 58, 60, and 62 there is an outer opening 66 which extends to a cylindrical opening 68 having a diameter sufficiently dimensioned to receive a corresponding alignment pin 57, 59, 63, 65 (FIG. 3A, 3B). A recess 70 is present within the upper part of receptacles 56, 58, 60, and 62 for receiving a corresponding arm or leg restraint. A clamp dog member 72 is also located within this recess and has a central pivot pin 74 for clamping a corresponding restraint 14, 16, 18, and 20 after the restraints are pulled inwardly during periods of pilot ejection. This ensures that the limbs of the pilot will be maintained in a restrained position close to his body, thereby minimizing the chance of injury to his limbs during ejection. A projection 76 extends centrally inwardly from the receptacles 56 and 58 for guiding connection of the upper fitting member 22 and connector 23.

The construction of the lower connector 23 will now be discussed in detail, referring to FIGS. 3A and 3B. An enlarged alignment pin 78 extends perpendicularly through a base plate 88. The lower end of pin 78 has an opening 80 formed therethrough to secure the pin to the seat 11. In order to maintain pin 78 in a vertical position, a guide 79 on the seat has a relief 81 formed therein for orienting the pin. The upper end of the pin is generally indicated by reference numeral 82 and is seen to have a generally square cross section. An upper section 84 is configured in the shape of a frusto-pyramidal configuration. This upper end portion 84 has a bore 86 axially formed therethrough for receiving PIP pin 48 (FIG. 2A). As will be appreciated from viewing FIGS. 1, 2A, and 3A, the upper fitting member 22 and connector 23 are brought into engagement wherein the portion of pin 78, above base plate 88, is received within the central opening 77 (FIG. 2A) of member 22. As it is being received, the projection 76 guides the insertion of pin 48 into bore 86. Similarly, alignment PIP pins 57, 59, 63, and 65 are received within the openings of receptacles 56, 58, 60, and 62. A peripheral flange 90 extends upwardly from the base plate 88 and assists the guiding of the upper fitting member 22 into full engagement with the lower connector 23. After connection of member 22 and connector 23, balls 50 become firmly extended thereby abutting against the shoulder 94 of recess 92 effectively latching the member 22 and connector 23 together. During normal operation of the device, they will remain so latched until the pilot pulls up the fitting member 22 when egressing.

FIG. 3A indicates four anchor plates 100 for receiving the knotted upper ends of lines 32, 34, 36, and 38. As illustrated in FIG. 1, the lower ends of these lines are appropriately connected to a shear pin 40, the latter being anchored to the cockpit floor 44 via bracket 42. Upon ejection of the seated pilot, the restraints 14, 16, 18, and 20 are pulled, as will be explained shortly, thereby displacing the limbs of the pilot inwardly toward his body until the stop 17 on each restraint contacts a respective recess 70 (FIG. 2B). Further ejection motion transmits tension to the lines 32, 34, 36, and 38 (FIG. 1) until shear pin 40 is broken thereby completely separating the pilot, his seat, the fitting member 22, and connector 23 from securement within the cockpit.

In operation of the invention, fitting member 22 is attached to a pilot's harness by means of straps 24 and 26. The mating connector 23 is attached to the cockpit floor by means of lines 32, 34, 36, and 38. When a pilot enters the cockpit, he connects the fitting member 22 and mating connector 23. During normal flight the restraints 14, 16, 18, and 20 are loose thereby allowing him a full range limb motion. The fitting member 22 and mating connector 23 remain in contact due to the insertion of PIP pin 48 (FIG. 2A) within bore 86 (FIG. 3A) wherein the detent balls 50 engage recess 92. After a successful flight the pilot may disengage the fitting member 22 from mating connector 23 by simply pulling up upon handle 54 (FIG. 2A) which disengages the PIP pin 48. However, during an emergency situation in flight, it becomes necessary to link the restraints 14, 16, 18, and 20 to the lines 32, 34, 36, and 38 so as to cause the arm and leg restraints to effectively slide through the interconnected fitting member 22 and mating connector 23 until the pilot's limbs are pulled in toward his body, thereby ensuring safety to these limbs during ejection from the cockpit.

The means for selectively linking the restraints to the lines are shown in FIGS. 4A–4C. Within each of the receptacles 56, 58, 60, and 62 is a generally hollowed cylindrical recess bushing 98 which receives a tubular member 96 therein, as shown in both FIGS. 2A and 4A. The bottom of restraint 16 is tied to the top of tubular member 96. Within the tubular member is a PIP pin 57 shown in both FIGS. 3A and 4A. The alignment PIP pin 57 is easily inserted within tubular member 96 when a pilot connects fitting member 22 and mating connector 23. The alignment PIP pin 57 includes a central rod 102 having a generally cylindrical section 104 which steps down to a neck section 106. The neck section then extends to chamfer 108, which in turn extends to a generally bullet-shaped end 110. The rod 102 is axially disposed within a sleeve 112, the latter having holes therein for loosely accommodating balls 114. As will be observed in FIG. 4A, the balls are radially restrained between the neck section 106 of rod 102 and the interior surface of tubular member 96. The sleeve 112 extends axially to an inverted cup section 116, the latter being retained within a receptacle 118 integrally formed with the base plate 88. A sleeve-like clip 122 retains the cup section 116 within receptacle 118. Anchor plate 100 to which a respective line, such as 32, is attached is also held within the cup section 116 by clip 122.

A step-down neck 124 of the cup section 116 is received within a mating opening 126 formed in base plate 88. Detent balls 120 are located within the cup section 116 and engage a groove 121 therein for assisting in the retention of the cup section 116 within the receptacle 118.

FIG. 4B illustrates movement between the components during initial ejection by a pilot. As the pilot is displaced upwardly, tension develops in restraint 16 thereby exerting upward forces on tubular member 96. However, balls 114 frictionally secure the tubular member 96 to the sleeve 112. The effect is a relative downward displacement of line 32. This causes downward displacement of anchor 100 which frees the anchor from the sleeve-like clip 122. The rod 102 has a stem 140 which is fastened to the anchor 100. Thus, rod 102 is forced downwardly to bottom out in sleeve 112, as indicated at position 138 in FIG. 4B. The downward displacement of the rod 102 is assisted by means of a coil spring 132 which is received in recess 130, the latter being formed within anchor 100. As will be clearly seen in FIG. 4B, the spring 132 is retained between shoulder 136 of recess 130 and an opposing shoulder 134 of the recess existing within the inverted cup section 116. It will be observed that, during intermediate displacement of rod 102, the sleeve 112 has moved relative to the rod 102 so that the balls 114 have passed over chamfer 108 and rest upon an enlarged diameter of bullet-shaped end 110. This effectively jams the rod 102 within the sleeve 112. As the pilot ejection displacement continues, restraint 16 is held fast. Since the restraint 16 is secured at its end to a pilot's arm, the arm is pulled downwardly and therefore toward the body as the ejection motion proceeds.

In FIG. 4C a substantial displacement of the components is illustrated. In this figure further downward pulling of line 32 results in linked downward displacement of rod 102 and sleeve 112 until the balls 114 engage the wedge end 128 at the lower end of sleeve 112. The end result is a jam fit between rod 102 and sleeve 112 and an effective linking of restraint 16 with line 32 as the tubular member 96 passes through the opening 126 in the base plate 88.

As the arm restraint 16 is pulled, the stop 17 approaches the top of recess 70 (FIG. 2A). When contact is made, the PIP pin assembly in FIG. 4C can no longer move downwardly so that tension quickly builds in line 32. It is this tension which breaks shear pin 40 thereby freeing the pilot entirely from the line 32. It should, of course, be appreciated that this example in connection with restraint 16 is likewise applicable for the remaining arm restraint 14 and the leg restraints 18 and 20.

Viewing FIG. 2A the clamp dog member 72 frictionally engages a respective restraint during ejection so as to ensure retention of the pilot's limb inwardly until seat separation and subsequent parachute employment which do not, per se, form part of the present invention. During ejection the fitting member 22 remains connected with mating connector 23 and will remain so until seat separation.

Accordingly, the present invention has been described with three attendant advantages for the pilot. The first is vertical torso restraint during normal flight which overcomes the effects of negative "G". The second and third objectives are met during ejection when the arms and legs of the pilot are brought in toward his body and retained there during the time for ejection, which minimizes the chance of injury to his limbs.

It should be understood that the invention is not limited to the exact details of construction shown and described herein for obvious modifications will occur to persons skilled in the art.

I claim:

1. A fitting for an aviator's harness, comprising:
   a first connector secured to the harness and housing first coupling members therein;
   a plurality of restraint lines, each of which is connected between a limb of the aviator and one of the first coupling members;
   a second connector secured to an aviator's seat and removably latched to the first connector;
   a plurality of attachment lines connected at lower ends thereof to a cockpit floor;
   a second coupling member housed within the second connector, each attachment line having an upper end connected to the second coupling member, the first and second coupling members coupling respective restraint and attachment lines in response to seat ejection thus resulting in inward limb displacement;
   stop means mounted to the restraint lines for limiting the inward displacement; and
   shear means securing the attachment lines to the cockpit floor for releasing the attachment lines upon displacement of the stop means to a position contacting the first connector member thus deploying sufficient tension in the coupled lines to cause breakage of the shear means and subsequent attachment line release.

2. The structure set forth in claim 1 wherein the first coupling member is removably secured within the first connector and comprises:
   a receptacle having a first end which is opened for receiving the second connector;
   an opposite end of the receptacle having an aperture for fastening an end of a corresponding restraint line thereto.

3. The structure set forth in claim 2 together with means for clamping the restraint line within the first connector thereby preventing retraction of the restraint line during ejection.

4. The structure set forth in claim 3 wherein the first connector further comprises a central PIP pin for detent engagement of a receptacle in the second connector.

5. The structure set forth in claim 1 wherein the second coupling member is a PIP pin assembly removably secured to the second connector and comprising:
   an anchor plate for securing a corresponding attachment line end;
   a rod fastened to the anchor plate;
   a sleeve slideably mounted to the rod;
   balls mounted in the sleeve for contacting an inner wall of the first connector receptacle, the latter receptacle having a thickened end for engaging the balls and creating frictional engagement between the rod, sleeve, and receptacle, thus coupling respective restraint and attachment lines in response to tension in these lines.

* * * * *